(12) United States Patent
Skillicorn

(10) Patent No.: US 7,481,934 B2
(45) Date of Patent: Jan. 27, 2009

(54) METHODS FOR TREATMENT OF WASTEWATER WITH POWDERED NATURAL LIGNOCELLULOSIC MATERIAL

(75) Inventor: Paul W. Skillicorn, Snow Hill, NC (US)

(73) Assignee: Renewable Fibers, LLC, Snow Hill, NC (US)

( * ) Notice: Subject to any disclaimer, the term of this patent is extended or adjusted under 35 U.S.C. 154(b) by 0 days.

(21) Appl. No.: 11/336,554

(22) Filed: Jan. 20, 2006

(65) Prior Publication Data

US 2007/0170115 A1 Jul. 26, 2007

(51) Int. Cl.
*C02F 3/00* (2006.01)

(52) U.S. Cl. .................. 210/608; 210/616; 210/626; 210/631

(58) Field of Classification Search .............. 210/603, 210/616, 617, 620, 626, 631, 150, 151, 195.3, 210/608
See application file for complete search history.

(56) References Cited

U.S. PATENT DOCUMENTS

| | | | | |
|---|---|---|---|---|
| 3,904,518 A * | 9/1975 | Hutton et al. | ............ | 210/616 |
| 3,957,632 A * | 5/1976 | Knopp et al. | ............ | 210/616 |
| 4,069,148 A * | 1/1978 | Hutton et al. | ............ | 210/616 |
| 4,073,722 A * | 2/1978 | Grutsch et al. | ............ | 210/631 |
| 4,292,176 A * | 9/1981 | Grutsch et al. | ............ | 210/616 |
| 4,810,386 A * | 3/1989 | Copa et al. | ............ | 210/626 |
| 4,897,196 A * | 1/1990 | Copa et al. | ............ | 210/626 |
| 4,919,815 A * | 4/1990 | Copa et al. | ............ | 210/631 |
| 5,068,036 A * | 11/1991 | Li et al. | ............ | 210/616 |
| 5,192,442 A * | 3/1993 | Piccirillo et al. | ............ | 210/616 |
| 5,302,288 A * | 4/1994 | Meidl et al. | ............ | 210/616 |
| 6,461,510 B1* | 10/2002 | Boles et al. | ............ | 210/620 |
| 2002/0148780 A1* | 10/2002 | Tiemeyer | ............ | 210/609 |
| 2006/0249451 A1* | 11/2006 | Tiemeyer | ............ | 210/616 |

* cited by examiner

*Primary Examiner*—Christopher Upton
(74) *Attorney, Agent, or Firm*—Triangle Patents, PLLC

(57) ABSTRACT

A process for treating wastewater through the use of powdered natural ligno-cellulosic materials (PNLM) for (a) physically removing colloidal and suspended volatile solids through adsorption and enhanced floc-formation and settling during pretreatment; (b) adsorbing toxic substances and elements that interfere with biological processes, thus serving to reduce their contact with and exposure to activated sludge organisms effecting wastewater treatment functions; (c) providing fixed surfaces in activated sludge wastewater treatment bioreactors for bacteria and other organisms favoring attached growth in circumstances devoid of such surfaces; (d) reducing production of biological sludge, while also helping to maintain high treatment efficiencies; and (e) following aeration, enhancing the settling characteristics of sludge with respect both to speed of settling and the vertical profile of the settled sludge.

33 Claims, 4 Drawing Sheets

METHODS FOR TREATMENT OF WASTEWATER WITH POWDERED NATURAL LIGNOCELLULOSIC MATERIAL

BACKGROUND OF THE INVENTION

1. Field of the Invention

The present invention relates to the treatment of wastewater, such as, for example, municipal, industrial or concentrated animal feeding operation (CAFO) wastewaters. This invention is especially useful in facilitating direct removal of contaminants from wastewaters and enhancement of biological processes for treating wastewater.

2. Prior Art

The treatment of contaminated wastewater from municipal, industrial or CAFO sources involves a sequence of processing steps for maximizing water purification at minimum costs. Industrial effluents, particularly wastewater from oil refineries and chemical factories, include a broad spectrum of contaminants, and, consequently, such wastewater is usually more difficult to decontaminate than wastewater from municipal sewage systems. Four main sequential process treatments are used to decontaminate such industrial effluents although similar treatment is given municipal effluents, or combined municipal/industrial effluents. These are primary, intermediate, secondary, and tertiary treatments. The primary treatment calls for removal of gross amounts of oil and grease and solids from the wastewater. In municipal and CAFO wastewater treatment, generally little free oil is present but solids removal is still needed. The intermediate treatment is the next process and it is designed to adjust water conditions so that the water entering the secondary treatment zone will not impair the operation of the secondary treatment processes. In other words, intermediate treatment is designed to optimize water conditions so that the secondary treatment process will operate most efficiently. The secondary treatment calls for biologically degrading dissolved organics and ammonia in the water. One of the most common biological treatment processes employed is the activated sludge process discussed below in greater detail. The tertiary treatment calls for removing residual biological solids present in the effluent from the secondary treatment zone and further removing trace contaminants which contribute to impairing water clarity or adversely affecting water taste and odor. This is usually a filtration of the water, preferably through beds of sand, or combinations of sand and coal, followed by treatment with activated carbon.

The activated sludge process is a conventional wastewater treating process which produces a high degree of biological treatment in a reasonably compact format. The application of this process to the treatment of industrial and CAFO wastewater has, however, been relatively slow compared with municipal applications. Industrial applications of this process are nevertheless increasing rapidly. Currently, the activated sludge process is capable of reliably achieving about 85% to 98% reduction in the five-day biochemical oxygen demand ($BOD_5$). However, the $BOD_5$ contaminants present in industrial wastewater are typically small compared with the total oxygen demanding contaminants present in such wastewater as measured by the chemical oxygen demand (COD) test. For example, the $BOD_5$ contaminants present in the effluent from an activated sludge process typically ranges from 2 to 20 parts per million parts of water. It is not uncommon to also find present in such effluent 10 to 20 times this amount of COD.

The activated sludge process generally has at least two, but preferably four stages of treatment. In the first stage, contaminated water is contacted with the activated sludge. The sludge includes microorganisms which feed on the contaminants in the water and metabolize those contaminants to form cellular structure and intermediate products. This decontaminated water flows into a second clarifier stage where suspended sludge particles are separated from the decontaminated water. A portion of the sludge is recycled to the first stage and the remainder can be forwarded to the third and fourth stages as is taught in Grutsch et al., U.S. Pat. Nos. 4,073,722 and 4,292,176. This sludge forwarded to the third and fourth stages includes water. In the third stage the sludge is thickened to remove excess water and in the fourth stage the thickened sludge is permitted to digest, that is, the microorganisms feed upon their own cellular structure and are stabilized. The digestion step stabilizes the microorganisms. U.S. Pat. No. 4,073,722 teaches dewatering, thickening, and digestion of activated sludge and powdered activated carbon mixtures.

Activated carbon is often used in tertiary treatment as a final cleanup for water discharged from the second stage clarifier. Some have taught that activated carbon, fine carbon (e.g., powdered anthracite) or fine particle clays such as bentonite and Fuller's earth can be used to treat wastewater in a biological treatment process. U.S. Pat. No. 3,904,518 teaches that between about 50 and 1500 parts of activated carbon or between about 250 and 2500 parts of adsorptive bentonite or Fuller's earth per million parts of feed wastewater can be beneficial in water purification. The carbon or Fuller's earth has a surface area of at least 100 square meters per gram and the activated carbon will typically have a surface area of between 600-1400 square meters per gram.

While a variety of powdered inorganic adsorbent materials have been used in biological treatment systems, powdered activated carbon remains the material most commonly used. Several mechanisms have been suggested as to how these materials enhance the treatment of wastewater: improved buffering; increased biological surface area for key organisms such as nitrifying bacteria that favor attached growth; decreased system sensitivity to toxic substances; improved phase separation, and adsorption. Adsorption is most important when the system is operated at low solids retention times (SRT)—namely, before particles are colonized by attached growth bacteria and other microorganisms. Thus, as particle surface area becomes less accessible, the role of adsorption decreases and the other mechanisms dominate.

The relatively high cost of activated carbon has served as a strong deterrent to common use of the material in activated sludge treatment of municipal, industrial and CAFO wastewaters. One approach to reducing cost of activated carbon has been recovery, regeneration and recycling of the activated carbon. This is best illustrated in the appropriately labeled Powdered Activated Carbon Treatment (PACT.TM.) system disclosed in U.S. Pat. Nos. 3,904,518 and 4,069,148, by Hutton et al. The PACT.TM. treatment system operates as a continuous flow process with an aeration basin followed by a discrete clarifier to separate biologically active solids and carbon from the treated wastewater. The recovered, regenerated powdered activated carbon is then returned to the aeration basin along with a portion of the recovered sludge.

Rehm and coworkers have further refined the use of activated carbon in the aerobic oxidation of phenolic materials by using microorganisms immobilized on granular carbon as a porous biomass support system. Utilizing the propensity of microorganisms to grow on and remain attached to a surface, Rehm used a granular activated carbon support of high surface area (1300 $m^2/g$) to which cells were attached within the macropores of the support and on its surface, as a porous biomass support system in a loop reactor for phenol removal. H. M. Ehrhardt and H. J. Rehm, Appl. Microbiol. Biotechnol., 21, 32-6 (1985). The resulting "immobilized" cells exhibited phenol tolerance up to a level in the feed of about 15 g/L, whereas free cells showed a tolerance not more than 1.5 g/L. It was postulated that the activated carbon operated like a "buffer and depot" in protecting the immobilized microorganisms by adsorbing toxic phenol concentrations and setting low quantities of the adsorbed phenol free for gradual biodegradation. This work was somewhat refined using a mixed culture immobilized on activated carbon [A. Morsen and H. J. Rehm, Appl. Microbiol. Biotechnol., 26, 283-8 (1987)] where the investigators noted that a considerable amount of microorganisms had "grown out" into the aqueous medium, i.e., there was substantial sludge formation in their system.

Suidan and coworkers have done considerable research on the analogous anaerobic degradation of phenol using a packed bed of microorganisms attached to granular carbon [Y. T. Wang, M. T. Suidan and B. E. Rittman, Journal Water Pollut. Control Fed., 58 227-33 (1986)]. For example, using granular activated carbon of 16 times 20 mesh as a support medium for microorganisms in an expanded bed configuration, and with feed containing from 358-1432 mg phenol/L, effluent phenol levels of about 0.06 mg/L (60 ppb) were obtained at a hydraulic residence time (HRT) of about 24 hours. Somewhat later, a beri-saddle-packed bed and expanded bed granular activated carbon anaerobic reactor in series were used to show a high conversion of COD to methane, virtually all of which occurred in the expanded bed reactor; P. Fox, M. T. Suidan, and J. T. Pfeffer, ibid., 60, 86-92 (1988). The refractory nature of ortho- and meta-cresols toward degradation also was noted.

The impregnation of flexible polymeric foams with activated carbon is known to increase the ability of fabrics and garments to resist the passage of noxious chemicals and gases see for example, U.S. Pat. Nos. 4,045,609 and 4,046,939. However, these patents do not teach the use of these foams in wastewater treatment, or that these foams are a superior immobilization support for the growth and activity of microorganisms.

Givens and Sack, 42nd Purdue University Industrial Waste Conference Proceedings, pp. 93-102 (1987), performed an extensive evaluation of a carbon impregnated polyurethane foam as a microbial support system for the aerobic removal of pollutants, including phenol. Porous polyurethane foam internally impregnated with activated carbon and having microorganisms attached externally was used in an activated sludge reactor, analogous to the Captor and Linpor processes which differ only in the absence of foam-entrapped carbon. The process was attended by substantial sludge formation and without any beneficial effect of carbon.

The Captor process itself utilizes porous polyurethane foam pads to provide a large external surface for microbial growth in an aeration tank for biological wastewater treatment. The work described above is the Captor process modified by the presence of carbon entrapped within the foam. A two-year pilot plant evaluation of the Captor process itself showed substantial sludge formation with significantly lower microbial density than had been claimed. J. A. Heidman, R. C. Brenner and H. J. Shah, J. of Environmental Engineering, 114, 1077-96 (1988). A point to be noted, as will be revisited below, is that the Captor process is essentially an aerated sludge reactor where the pads are retained in an aeration tank by screens in the effluent line. Excess sludge needs to be continually removed by removing a portion of the pads via a conveyor and passing the pads through pressure rollers to squeeze out the solids.

In U.S. Pat. No. 6,395,522 DeFilippini and coworkers describe a biologically active support system for providing removal of pollutants such as aliphatics, aromatics, heteroaromatics and halogenated derivatives from waste streams. The support contains a particulate adsorbent such as activated carbon bound by a polymer binder to a substrate such as a polymeric foam, and a bound pollutant-degrading microorganism. They claim that the biologically active support can be used in conventional aerobic biological waste treatment systems such as continuous stirred reactors, fixed-bed reactors and fluidized bed reactors.

H. Bettmann and H. J. Rehm, Appl. Microbial. Biotechnol., 22, 389-393 (1985) have employed a fluidized bed bioreactor for the successful continuous aerobic degradation of phenol at a hydraulic residence time of about 15 hours using *Pseudomonas putida* entrapped in a polyacrylamide-hydrazide gel. The use of microorganisms entrapped within polyurethane foams in aerobic oxidation of phenol in shake flasks also has been reported; A. M. Anselmo et al., Biotechnology B.L., 7, 889-894 (1985).

Known bioremediation processes suffer from a number of inherent disadvantages. For example, a major result of increased use of such processes is an ever increasing quantity of sludge, which presents a serious disposal problem because of increasingly restrictive policies on dumping or spreading untreated sludge on land and at sea. G. Michael Alsop and Richard A. Conroy, "Improved Thermal Sludge Conditioning by Treatment With Acids and Bases", Journal WPCF, Vol. 54, No. 2 (1982), T. Calcutt and R. Frost, "Sludge Processing—Chances for Tomorrow", Journal of the Institute of Water Pollution Control, Vol. 86, No. 2 (1987) and "The Municipal Waste Landfill Crisis and A Response of New Technology", Prepared by United States Building Corporation, P.O. Box 49704, Los Angles, Calif. 90049 (Nov. 22, 1988). The cost of sludge disposal today may be several fold greater than the sum of other operating costs of wastewater treatment.

A slightly different biophysical treatment process is described by McShane et al., in "Biophysical Treatment of Landfill Leachate Containing Organic Compounds", Proceedings of Industrial Waste Conference, 1986 (Pub. 1987), 41st, 167-77. In this process a biological batch reactor is used with powdered activated carbon and the system is operated in the "fill and draw" mode, also known as the sequenced batch reactor (SBR) mode. A similar scheme for treatment of leachate is disclosed in U.S. Pat. No. 4,623,464 by Ying et al. in which an SBR is operated with both biologically active solids and carbon present to treat a highly toxic PCB and dioxin-containing leachate. Supplementation with powdered activated carbon has been successfully demonstrated to improve treatment of widely differing wastewater streams in all such variations of the activated sludge process. Use of powdered activated carbon in this manner remains, nevertheless, rare—particularly in treatment of municipal wastewaters where cost factors are paramount. Most wastewater treatment plant owners and treatment plant managers and system operators deem the cost of doing so to be excessive.

The literature and prior art does not provide any instruction on substituting renewable powdered natural lignocellulosic materials for the carbon and clays and other inorganic and manufactured adsorbents now deemed to be too costly by potential users. A number of such materials, notably kenaf core, have available surface area to weight ratios that are comparable to activated carbon and greatly exceed those of fine clays and carbon dust. Because they are generally cropped materials, these renewable resources can be delivered at much lower cost than activated carbon. Because they are biodegradable, they can also easily be disposed of along with the other sludge constituents. As such, these natural materials hold potential to succeed in achieving widespread usage where activated carbon, clays and carbon dust have not succeeded.

SUMMARY OF THE INVENTION

This invention relates to the treatment of wastewater. Most commonly, the pH of wastewater is from about 4 to about 11, or is treated with chemicals so as to adjust the pH into this range. Commonly the wastewater contains about 25 to about 15,000 mg/l of total suspended solids.

It is an object of this invention to provide an improved wastewater treating process that is generally applicable to treatment of municipal, industrial and CAFO waste streams which may differ significantly as to their characteristics—ranging from high to low with respect to BOD, COD, TOC, suspended solids, dissolved material, total nitrogen, total phosphorus, and presence of greases, oils, toxins and heavy metals. It is an object of this invention to provide both physical and biological treatment processes that can more efficiently and economically decontaminate municipal, industrial and CAFO waste streams through the supplementary use of powdered kenaf core (PKC) and other powdered natural lignocellulosic materials (PNLM).

It is another object of this invention to provide an improved PNLM and/or PKC enhanced activated sludge process that significantly reduces sludge production and therefore sludge disposal costs.

Yet another object of this invention is to provide a PNLM and/or PKC enhanced activated sludge process that significantly enhances the floc and settling characteristics of activated sludge solids, thus increasing the speed and efficiency of sludge settling, lowering the profile of settled sludge in clarifiers, and therefore increasing the hydraulic throughput capacity of those clarifiers.

A further object of this invention is to provide improved pre- and post-treatment of wastewaters in which fresh PNLM and/or PKC inputs are employed to remove adsorbable materials, dissolved and suspended, both before and after treatment by an activated sludge process—thus greatly improving both the efficiency of the activated sludge process and the final quality of the treated discharged effluent.

Still another object of this invention is to provide a PNLM and/or PKC enhanced activated sludge process with in situ recovery or recycling of unregenerated PNLM and/or PKC that is applicable to continuous and batch operated biological treatment systems and to all biological processes including aerobic, anaerobic and anoxic in which a means is provided to remove potentially biotoxic materials such as heavy metals and PCBs or phenols so as to create and to maintain non-biotoxic conditions. Accordingly, a broad embodiment of this invention is directed to any activated sludge process for the biological treatment of contaminated waste streams comprising, in combination, the steps of:

(a) contacting a raw, contaminated waste stream with fresh PNLM and/or PKC to physically remove oils, greases, colloidal and adsorbable materials in a pre-treatment phase before onset of activated sludge processing;

(b) separating by floatation and gravity the powdered PNLM and/or PKC and adsorbed materials from the pre-treated waste stream;

(c) contacting a contaminated waste stream with both fresh and unregenerated recycled PNLM and/or PKC adsorbent and activated sludge comprising cellular microorganisms for a time sufficient to biologically degrade contaminates in the waste stream, thereby producing a decontaminated waste stream;

(d) separating by gravity the activated sludge and the powdered PNLM and/or PKC adsorbent from the decontaminated waste stream;

(e) recycling the recovered adsorbent and activated sludge for recontact with a contaminated waste stream, the recovered adsorbent remaining unregenerated prior to recontact.

(f) contacting an activated sludge treated waste stream with fresh PNLM and/or PKC to physically remove residual solids and adsobable materials in a post-treatment phase following completion of activated sludge processing;

(g) separating by gravity the powdered PNLM and/or PKC and adsorbed materials from the post-treated waste stream;

Note that the three sequences—(a) through (b), (c) through (e), and (f) through (g)—can be performed independently or in combination.

It is still further an object of this invention to provide a powdered kenaf core having good adsorption and separation characteristics.

These as well as other embodiments of the present invention will become evident from the following, more detailed description of certain preferred embodiments.

DESCRIPTION OF THE PREFERRED EMBODIMENTS

Figure 1:
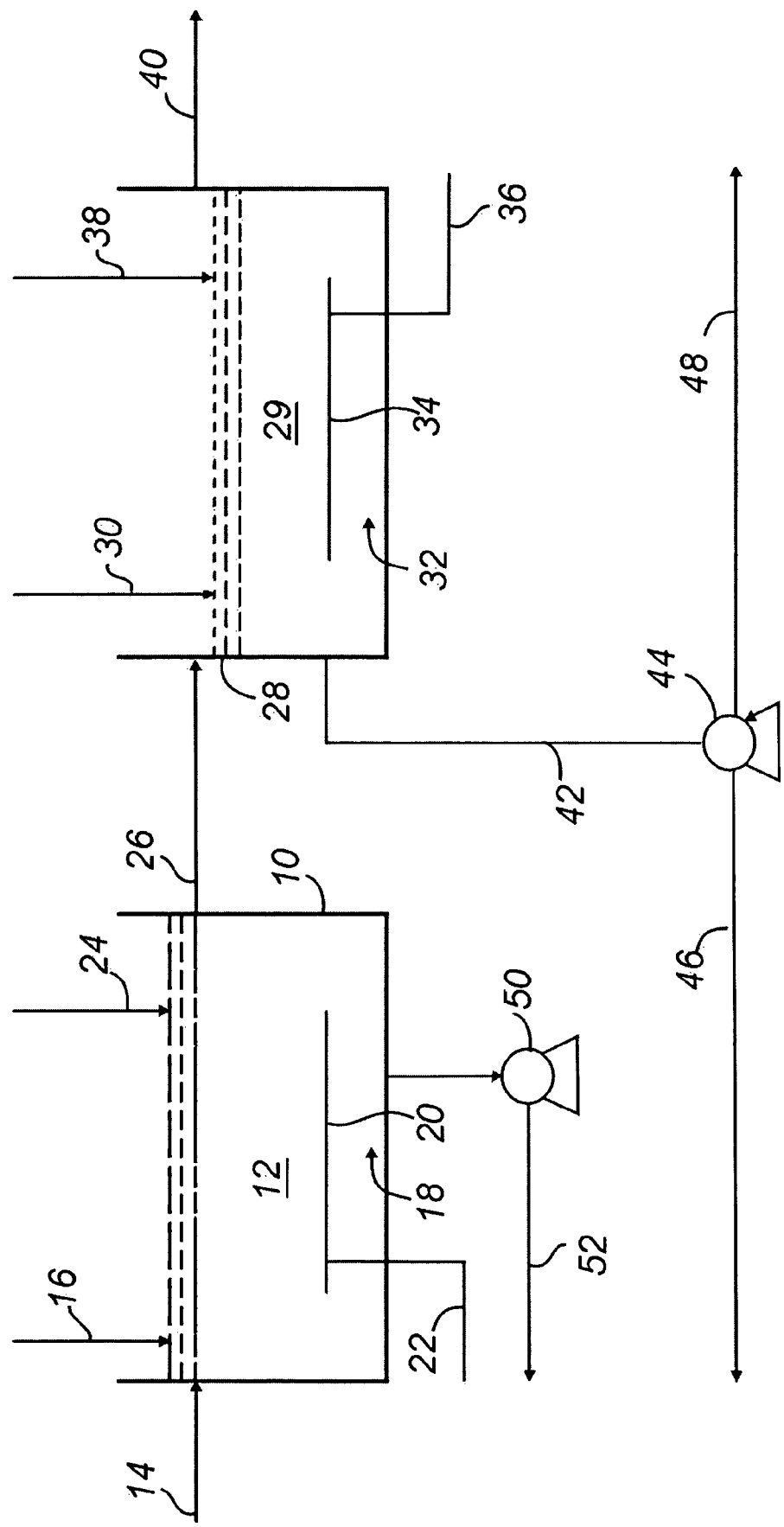
FIG. 1 is a schematic flow diagram of one embodiment of the invention in which wastewater is intermittently introduced into the primary treatment zone.

The present invention provides an improved process for treating water in which powdered natural lignocellulosic material (PNLM), especially powdered kenaf core (PKC), is added to the wastewater. The preferred kenaf core material has a surface area greater than about 200, more preferably greater than about 400, and still more preferably greater than about 500 square meters per gram. Commonly such kenaf core is in powdered form and has a particle size such that at least 50 percent of it will pass through 100 mesh per inch sieve, although generally about 70 to about 99 percent will pass through such a sieve.

In many cases wastewater is contacted with about 1 to about 5000 mg/l PNLM and/or PKC, but commonly about 1 to about 1000 mg/l is used. One especially preferred process for treating wastewater through contact with PKC comprises adding powdered kenaf core to the wastewater at a concentration of 1 to 40 mg/l based on feed water while said kenaf is present in the water at a concentration substantially in excess of the addition concentration. This can be accomplished, for example, by recycling the kenaf with the activated sludge.

PNLM and/or PKC is generally used in an integrated, multi-step wastewater treating process. It can optionally be used in each step to enhance treatment—providing both physical and biological advantages to the various steps of the process. In primary treatment, gross amounts of oil, grease and solids are removed from the wastewater. In treating municipal wastewater, generally little oil is present but solids removal is carried out using clarifiers of conventional design. The effluent from this primary treatment typically includes from about 25 to about 150 parts of suspended solids per million parts of water and from about 25 to about 300 parts of oil and grease per million parts of water. In treating municipal waste, the oil level may be even lower. As is not commonly recognized, such wastewater containing relatively large amounts of oil and/or solids, cannot be fed directly into an activated sludge process where the sludge age is in excess of about ten days without upsetting the activated sludge process. Generally, if the water entering the activated sludge process contains more than about twenty parts of solids per million parts of water and/or more than about twenty parts of oil and grease per million parts of water, downstream treatment is greatly impaired. In many cases, more than about ten parts per million of solids and/or about ten parts per million of hydrocarbon can be detrimental. Excessive amounts of oil and hydrocarbon can result in gross quantities of oily, emulsified material collecting in the first stage or mixed liquor tank of the activated sludge process. Such oily, emulsified solids impair or prevent the activated sludge from decontaminating the water, causing the effectiveness of the activated sludge process to be substantially diminished. Therefore it is often important to reduce chemical oxygen demand and remove excessive oil and solids from the wastewater by intermediate treatment.

After primary treatment, wastewater is then commonly subjected to intermediate treatment where excessive solids and/or hydrocarbons are removed, chemical oxygen demand is reduced, and contaminant concentrations are equalized so that such concentrations of contaminants remain more or less constant even though the contaminant concentration in the influent to the equalization treatment stage sharply changes from time to time. If, for instance, wastewater from a petroleum-chemical complex is being treated, it is desirable that the waste streams be combined and then subjected to intermediate treatment. If contaminant concentration in the influent changes and such change is sustained, this will ultimately result in a change in the contaminant concentration in the effluent from the equalization section. In staged equalization zones, this change will occur gradually over a relatively long time interval. This permits the microorganisms in the downstream activated sludge process to adapt or acclimate to this change in contaminant concentration while maintaining process purification efficiency. In circumstances where oil and/or colloidal and solids content is high, PNLM and/or PKC may be added to the pre- or primary treatment step with good results. Powdered kenaf core, in particular, has been recognized by the US Navy to be the most oil adsorbent natural material known to exist—picking up between 8 and 12 times its weight in oil, depending on that material's viscosity (United States Naval Facilities Engineering Center, "Evaluation of Bio-Based Industrial Products for Navy and DOD use: Phase I Kenaf Absorbent", NFESC Technical Report, TR-2101-ENV, March 1999). The high surface to weight ratio of powdered kenaf core also greatly facilitates flocculation and coagulation of colloidal material and suspended solids. Relatively small amounts of fresh PKC, when mixed well with raw wastewater in a pre- or primary treatment step will quickly produce a relatively compact floating coagulant mass containing oils and greases that is easily removed by skimming, and a relatively compact, settled coagulated floc that can be continuously removed from the bottom of a settling basin or by screening or filtration using conventional equipment and methodologies.

Intermediate treatment generally also includes equalization (along with such filtration and solids and oil removal). Equalization can be conducted in a basin having two, preferably three or even four or more compartments. These compartments are mixed and arranged in series so that water flows from one compartment to the next succeeding compartment. The total retention time of water in the basin is less than about 20 to 30 hours. Consequently, heat loss is minimized. Normally, the difference in temperature between the influent and effluent water is 20. degree. F. or less. Preferably the retention time in each compartment is 30 to 500 minutes.

In circumstances where industrial wastewaters are high, flows from the various sources are mixed in the first compartment, and the contaminant concentration is monitored. Usually pH, toxic metals, known toxic compounds, COD contaminants, phenolic, and ammonia concentrations are measured either manually or automatically. Since wastewaters from multiple sources are fed into the relatively confined space in the first compartment, several advantages occur. First it is easy to monitor contaminant concentration and readily detect any drastic change in concentration indicating, for example, a break in a chemical line. The reason is because the first compartment in a multiple compartment system will more rapidly increase in concentration to more readily detectable levels than a single compartment system. Also, neutralization is achieved. For example, one source of water may be highly acidic and another highly basic. Neutralization occurs as these streams mix in the first compartment. Waste streams from municipal sources generally do not vary greatly in the acid/basic content. It is important to adjust the pH in the equalization basin in order to maximize oxidation of certain contaminants, particularly sulfides. pH may be adjusted by adding acid or base to the water in the second compartment until the water has a pH ranging from about 6.5 to about 9.5, preferably between 7.5 and 8.5 In some cases at least about one part, preferably about three parts, still more preferably about five parts, of dissolved oxygen per million parts of water must be present to satisfy the immediate oxygen demand (IOD) of the contaminants in the water at a reasonable rate of oxidation when certain contaminants such as sulfides are present. Preferably catalysts such as hydroquinone or gallic acid are added to the water to catalyze the oxidation of IOD contaminants. If this IOD is not satisfied, the downstream activated sludge process can be adversely affected. Consequently, the water in the equalization basin should be aerated. Conventional floating aerators may be used. Aeration is more effective in a confined zone. About 0.15 or more horsepower per thousand gallons of water generally provides excellent aeration. Aeration also thoroughly agitates and mixes the water with the result that colloidal and suspended oils and solids are mechanically flocculated and accumulate on the water surface. These oily solids are removed by skimming. In order to ensure that the water to the activated sludge process includes less than about twenty parts of hydrocarbon, such as oil and grease, per million parts of water and/or less than about twenty parts of solids per million parts of water, PNLM and/or PKC (or another flocculating agent) may be added to the water in the equalization basin or to the stream of water flowing to the activated sludge process. It is preferable to reduce the solids and/or hydrocarbon content of the wastewater to less than about ten parts per million respectively. The PNLM and/or PKC (or other comparable coagulating and/or flocculating agent) destabilizes colloidal particles which then aggregate. The aggregates are carried with the effluent stream to a filter and removed prior to introduction of the stream to the activated sludge process. Air is preferably introduced into the stream of water flowing into the downstream activated sludge process to ensure that the immediate oxygen demand to the water is satisfied. In circumstances where influent COD is extremely high—such as is common with industrial and CAFO wastewaters—it is extremely desirable to substantially reduce chemical oxygen demand prior to biological treatment. Commonly the chemical oxygen demand is reduced by about fifty percent, but preferably by about seventy percent. In a more preferred mode of operation chemical oxygen demand is reduced to essentially the soluble organic component prior to biological treatment.

Water from intermediate treatment generally flows through an activated sludge plant. In preferred activated sludge processes the sludge-water mix undergoes at least one anoxic stage, at least one aeration stage and at least one clarifying stage, and the sludge of different ages from different stages is recycled to one or more upstream stages of the activated sludge process. In a preferred first stage, water from the intermediate treatment is mixed with returned, clarified sludge in an anoxic zone/stage. This is followed by aeration and then clarification, with a portion of recovered sludge returned to the anoxic sequence and a portion further treated downstream. These steps or phases can be accomplished in multiple vessels or tanks, a continuous sequenced channel or alternatively in batch mode in a single vessel or tank.

The effluent from the clarifier or third stage of the activated sludge process is filtered or otherwise clarified to remove biological solids in the effluent and then may again be contacted with PNLM and/or PKC to remove odor causing and other residual trace components by adsorption. Chemical agents and flocculants may also be added to the clarifier effluent to destabilize colloidal suspensions and assist filtration. However, where interstage aeration has increased the oxygen content of water to at least one, preferably at least three parts, more preferably five parts, of dissolved oxygen per million parts of water, organisms collected in the filter and on the PNLM and/or PKC are maintained in an aerobic condition, and odor and any degradation in quality of the filtered effluent is avoided. Further, the effluent water to the receiving stream has a high level of oxygen in it. Thus, it does not contribute to deterioration of the water quality of the receiving stream.

Although PNLM and/or PKC can be added, with good effect, to any wastewater stream there are preferred points of addition in a multistage wastewater treatment process. We have already noted the possibility of adding PNLM and/or PKC during pre- or primary treatment to remove high oil, grease and/or volatile solids content (BOD and COD) of influent wastewater. It is most common to add PNLM and/or PKC to the first or second stages of an activated sludge process. It is also preferred to introduce PNLM and/or PKC before the first stage of an activated sludge process, such as to the sludge being returned from the clarifier to the anoxic phase. In this manner, fresh PNLM and/or PKC is exposed to the equilibrium residual soluble organic contaminants and essentially eliminates any mixing or short circuiting problems in the aeration tank that would expose fresh PNLM and/or PKC to incoming organics. This can prevent the adsorption by active sites on the PNLM and/or PKC with the wrong organics. The rundown line between first and second stages, when used with a wide-well clarifier can provide extended contact time between the wastes and the PNLM and/or PKC.

Another preferred point of addition for PNLM and/or PKC is after the third stage of the activated sludge process, for example, to the decontaminated water leaving the third stage. In this manner, fresh PNLM and/or PKC (i.e., material that has not already been colonized by microorganisms) is exposed to only residual soluble contaminants and said PNLM and/or PKC can be removed by an additional clarification step or captured by downstream final filters. The PNLM and/or PKC captured by the filters contributes the attributes of a granular media bed to the PNLM and/or PKC system and exposes PNLM and/or PKC for long periods to the residual contaminants, thereby more fully utilizing the adsorptive capacity of the material. When the final filters begin to deactivate or clog, they can be backwashed to the first stage so that PNLM and/or PKC with residual organics resistant to bio-oxidation are returned to the aeration tank, or to the fourth stage or the aerobic stabilization tank. When backwashed to the aerobic stabilization tank, the PNLM and/or PKC presents a concentrate of resistant organics to the microorganisms for an extended period of time which encourages the proliferation of species capable of metabolizing the resistant organics. Recirculation of a slipstream of this sludge system and combining with the principle sludge mass encourages the reduction of the resistant organics by the principal sludge mass, thereby minimizing the load on PNLM and/or PKC.

Another preferred point of addition of PNLM and/or PKC is into the portion of the digested sludge from the fourth stage which is mixed with water and sludge entering the second stage. If the biochemical system for minimizing residual COD resistant to removal depends on exoenzymes from slow reproducing organisms, this point of addition will expose fresh PNLM and/or PKC to a preferred point in the process for adsorbing these enzymes. Acting as a carrier for these enzymes, the PNLM and/or PKC provides a means for their capture and incorporation into the sludge mass rather than permitting them to escape in the effluent.

A preferred method of operating a multi-stage wastewater treating process is to use PNLM and/or PKC in conjunction with high sludge age. Generally an average sludge age greater than about 10 days is advisable, preferably greater than about 20 days and still more preferably greater than about 30 days. The higher sludge ages maximize PNLM and/or PKC utilization and result in extremely high PNLM and/or PKC concentrations, while also allow time for slowly reproducing autotrophic bacteria (nitrifying bacteria, specifically) to fully colonize the PNLM and/or PKC. This results in more efficient and more effective water purification. In circumstances featuring highly contaminated influent wastewater (such as landfill leachate), it is most desirable to operate at sludge ages in excess of 75 days or even 150 days. It should be noted that when adding fresh PNLM and/or PKC, for example, to the wastewater entering the first stage and also operating at high sludge age, there tends to be an accumulation of PNLM and/or PKC in certain parts of the system. This allows the addition of low levels of PNLM and/or PKC on a per gallon or per pound of wastewater basis, while concentrating the PNLM and/or PKC within the system. This leads to better utilization of PNLM and/or PKC and higher process effectiveness. Also, high sludge age has the merits of good stability and high effectiveness. In order to operate at a high sludge age, it is preferred that the oil and grease and suspended solids level and chemical oxygen demand be reduced by intermediate treatment as previously discussed.

An example of the use of high sludge age would be in the activated sludge process wherein a first and second stage contaminated water is contacted with activated sludge for a period of time sufficient to biologically degrade contaminants in the water and in a third stage where decontaminated water is separated from the activated sludge. A first portion of said separated sludge is recycled for recontact with the water in the first anoxic stage and a second portion of said separated sludge is treated in downstream operations. About 1 to about 500 mg/l of PNLM and/or PKC is introduced into the wastewater so that the PNLM and/or PKC is present in the first stage, and the activated sludge system is operated at an average sludge age in excess of ten days. Preferably about 1 to about 200 mg/l of PNLM and/or PKC is introduced into the wastewater and the activated sludge system is operated at an average sludge age in excess of twenty days. Still more preferably 1 to 40 mg/l of PNLM and/or PKC is introduced into the wastewater. Still more preferably the activated sludge system is operated at an average sludge age in excess of thirty days.

First Preferred Embodiment

Referring to FIG. 1, a wastewater containing organic and adsorbable pollutants is introduced into a primary treatment zone or tank 10 including an aeration and settling zone 12.

If the wastewater contains an excessive amount of oils and/or solids, it can be pretreated and clarified by settling, decantation or filtration to reduce the solids content prior to treatment in the primary treatment zone 10. Any such pretreatment will preferably include use of PNLM and/or PKC to enhance removal of solids and/or oils in the manner described above. The clarified or unclarified wastewater is introduced via a conduit 14 into the aeration and settling zone 12 wherein it is aerated with a pressurized oxygen containing gas, such as air, in the presence of sufficient amounts of a powdered PNLM and/or PKC adsorbent and biologically active solids to reduce the BOD, COD, TOC and adsorbable pollutants to desired levels.

The PNLM and/or PKC adsorbent must be finely divided and readily dispersible in an aqueous medium. Various adsorbents useful in purifying wastewaters can be used. Suitable adsorbents include sphagnum moss, hemp hurd, jute stick, balsa wood, other hard and soft woods, kenaf core, straws, grass specie stems, bamboo specie stems, reed stalks, peanut shells, coconut husks, pecan shells, rice husk, corn stover, cotton stalk, sugar cane bagasse, conifer and hardwood barks, corn cobs, other crop residuals and any combination thereof, with powdered kenaf core (PKC) being preferred. The adsorbent can be added to the aeration and settling zone 12 in any suitable manner, for example, as an aqueous slurry introduced through a conduit 16 or added to the incoming wastewater in the conduit 14.

The amount of adsorbent present in the aeration and settling zone 12 varies, depending primarily on the nature of the wastewater and the degree of treatment desired, i.e., the desired resulting levels of BOD, COD and TOC. Generally, this amount usually is about 50 to about 5,000 milligrams of adsorbent per liter of wastewater. However, some more toxic wastewaters require up to as much as 20,000 milligrams of adsorbent per liter of wastewater and adsorbent concentrations as low as 5 milligrams per liter of wastewater are effective for some less toxic wastewaters.

The biologically active solids present in the aeration and settling zone 12 are suspended solids containing different types of bacteria formed by contacting wastewater, bacteria and oxygen. They can be activated sludge or activated solids found in oxidation ponds and other biological water treatment processes. Generally, the amount of biologically active solids present in the aeration zone provides a total suspended solids concentration (a combination of both adsorbent and biologically active solids) of about 10 to about 50,000 parts per million wastewater.

For some wastewaters, particularly some industrial and CAFO wastewaters, it may be necessary to add biologically active solids to the aeration and settling zone 12 during start up to obtain the desired concentration thereof. The process produces its own biologically active solids which can be recycled to the aeration and settling zone 12 from the contact zone, as described below, to ensure the proper level of bacteria in the aeration zone. Once a suitable concentration of biologically active solids has been reached in the aeration and settling zone 12, that level usually can be maintained without the external addition of the biologically active solids. The above concentration of adsorbent present in the aeration and settling zone 12 includes fresh adsorbent added to the aeration and settling zone via the conduit 14 or the conduit 16, as well as adsorbent recycled to the aeration and settling zone along with biologically active solids.

The adsorbent and biologically active solids (mixed liquor solids) are mixed with the wastewater by a pressurized oxygen-containing gas, such as air, introduced into the aeration and settling zone 12 by an aeration system 18 including a sparger 20 to which the pressurized oxygen-containing gas is supplied via a conduit 22. Other suitable aeration distribution means which causes dissolution of oxygen in the mixture and produces agitation can be used. Also, this aeration may be supplemented by mechanical stirring means.

In the embodiment illustrated in FIG. 1, as a predetermined quantity of wastewater is being introduced into the primary treatment zone 10, it is mixed by aeration in the aeration and settling zone 12 with biologically active solids and powdered natural lignocellulosic adsorbent added via the conduit 16 or to the incoming wastewater flowing through the conduit 14. The amount of wastewater introduced can be controlled by various suitable means such as a liquid level control which is operable to close a flow control valve (not shown) or terminate operation of a pump (not shown) in response to the liquid level in the aeration and settling zone 12 reaching a predetermined upper limit. After a predetermined reaction time of about 20 minutes to about 24 hours, aeration is terminated to permit a majority of the suspended solids to settle by gravity in the aeration and settling zone 12 and produce a partially-treated wastewater or first clarified aqueous phase and a first settled solid phase. Additional adsorbent can be added to the aeration and settling zone 12 during the reaction period after the predetermined amount of wastewater has been introduced into the primary treatment zone 10.

To accelerate the settling of these solids, a flocculation aid can be added via a conduit 24 to the aeration and settling zone 12. The flocculent aid preferably is added shortly before aeration and agitation are terminated in order to ensure homogeneous mixing with the partially-treated wastewater without causing premature settling of the solids. The flocculant aid will preferably consist of relatively small quantities of fresh PNLM and/or PKC, but it can optionally include other common materials such as alum or polymers. The settling period can be varied to meet the requirements of the wastewater being treated. Generally, the settling period is for a time sufficient to permit a majority of the solids to settle and only a relatively small amount of solids (e.g., 5 to 500 milligrams of total suspended solids per liter of the first clarified aqueous phase) remains in the first clarified aqueous phase.

After completion of the settling period, a predetermined amount of the first clarified aqueous phase is withdrawn from the aeration and settling zone 12 via a conduit 26 and transferred to a contact tank 28 for further treatment. This can be controlled by various suitable means such as a liquid level control which is operable to terminate the operation of a pump (not shown) in response to the liquid level in the aeration and settling zone 12 dropping to a predetermined lower limit.

The contact tank 28 includes a mixing and settling zone 29 which is at least partially filled with the partially-treated wastewater withdrawn from the aeration and settling zone 12. As the mixing and settling zone 29 is being filled, fresh powdered natural lignocellulosic adsorbent, which preferably is the same as that used in the aeration and settling zone 12 (e.g., powdered kenaf core), is introduced via a conduit 30 into the mixing and settling zone 29 and mixed with the incoming partially-treated wastewater by a suitable agitation means. Alternatively, fresh powdered adsorbent can be added to the incoming partially-treated wastewater as it flows through the conduit 26. While the agitation means can be a mechanical stirring means, in the specific embodiment illustrated, it is an aeration system 32, similar to the one used in the aeration and settling zone 12 and includes a sparger 34 to which a pressurized oxygen-containing gas is supplied through a conduit 36. Agitation by aeration is preferred because oxygen is provided to the bacteria present in the biologically active solids carried over in the partially-treated wastewater from the primary treatment zone 10 and enhances metabolization of pollutants present in the mixing and settling zone 29. The amount of adsorbent added to the partially-treated wastewater in the mixing and settling zone 29 varies, depending primarily on the degree of treatment desired, i.e., desired maximum levels of BOD, COD and TOC in the effluent. Generally, this amount may be as low as about 10 and as much as about 10,000 milligrams of adsorbent per liter of the incoming partially-treated wastewater. After a predetermined reaction time, which can be as short as about 20 minutes and up to as much as about 100 hours, agitation is terminated to permit the suspended solids to settle by gravity and produce a substantially solids-free second clarified aqueous phase and a second solids phase containing adsorbent and biologically active solids.

To accelerate settling of these solids, a flocculation aid like that used in the aeration and settling zone 12 can be added via a conduit 38 to the mixing and settling zone 29. The flocculent aid preferably is added shortly before agitation is terminated in order to ensure homogeneous mixing with the partially-treated wastewater without causing premature settling of the solids. The amount of flocculant aid added is sufficient to promote the desired settling of the solids, primarily the adsorbent. Generally, this amount is about 0.1 to about 10 milligrams of flocculant aid per liter of partially-treated wastewater. The settling period can be varied to meet the requirements of the wastewater being treated. For instance, if the suspended solids are difficult to settle, the settling time can be increased as required. After completion of the settling period, a predetermined amount of the second clarified aqueous phase is withdrawn from the contact tank 28 via a conduit 40 for disposal or reuse. These fill, agitation, settling and draw steps are then repeated. The length of fill time for the contact tank 28 usually is governed by the predetermined amount of the first clarified aqueous phase withdrawn from the aeration and settling zone 12. The contact tank 28 can include control means (not shown) for terminating agitation a predetermined time after the liquid level in the mixing and settling zone 29 has reached a predetermined upper limit, commencing introduction of the flocculant aid a predetermined time after the liquid level reaches the upper limit and before termination of agitation, and terminating withdrawal of the second clarified aqueous phase when the liquid level drops to a predetermined lower limit.

All or a portion of the settled second solids phase (powdered natural lignocellulosic adsorbent such as powdered kenaf core and biologically active solids) can be withdrawn from the contact tank 28 via a conduit 42 and pump 44 and recycled via a conduit 46 to the primary treatment zone 10, either by combining with the incoming wastewater (as illustrated) or added directly to the primary treatment zone 10, to maintain the desired concentration of total suspended solids in the aeration and settling zone as mentioned above. If desired, all or a portion of the solids withdrawn from the contact tank 28 can be discharged via a conduit 48 to waste after dewatering or other further treatment. Withdrawal of these solids can be controlled by suitable control means which, after completion of the draw cycle, operates the pump 44 when the solids level in the contact tank 28 reaches a predetermined level.

The retention time of solids in the primary treatment zone 10 can be controlled by withdrawing a portion of the mixed liquor solids with a pump 50 or the like and discharging via a conduit 52 to waste, after dewatering or other further treatment. While the primary treatment zone 10 and the contact tank 28 are illustrated as separate units, they can share common walls. For example, the contact tank 28 can be a walled off portion of a large aeration basin and include the appropriate controls for liquid and solids flow to provide the desired flow scheme.

Second Preferred Embodiment

Figure 2:
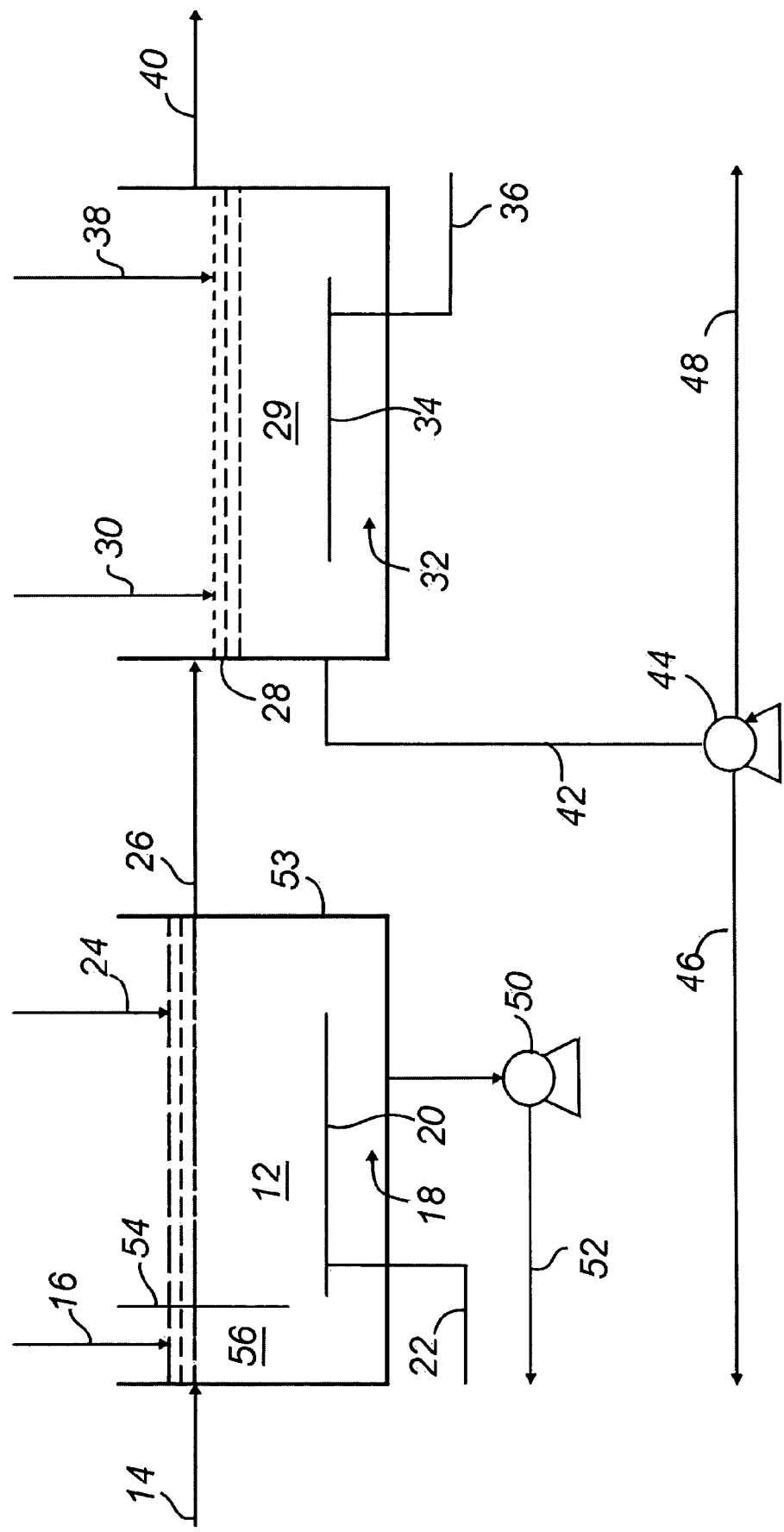
FIG. 2 is a schematic flow diagram of another embodiment of the invention in which wastewater flows continuously into the primary treatment zone.

In the embodiment illustrated in FIG. 2, the contact tank 28 is arranged and operates in the same manner as described above. Accordingly, components common with those illustrated in FIG. 1 are designated with the same reference numerals. In this embodiment wastewater flows continuously into the primary treatment zone 53; however, the aeration and settling zone 12 is operated in a batchwise manner. The operating conditions for the aeration and settling zone 12 can be substantially the same as those described above. Components of the primary treatment zone 53 common with those illustrated in FIG. 1 are designated with the same reference numerals. The primary treatment zone 53 includes a downwardly extending baffle 54 defining a turbulent inlet zone 56 which is substantially isolated from and is in continuous fluid communication with the aeration and settling zone 12. The wastewater flowing from the inlet zone 56 into the aeration and settling zone 12 is mixed therein by aeration with biologically active solids and powdered adsorbent which can be added to the aeration and settling zone 12, to the turbulent inlet zone 56 via the conduit 16 or to the incoming wastewater flowing through the conduit 14. Aeration is terminated when the liquid level in the aeration and settling zone 12 reaches a first predetermined upper limit. The inflow of wastewater is controlled so there is sufficient time for the desired reaction to occur by the time the liquid level reaches the first predetermined upper limit. A flocculant aid can be added to the aeration and settling zone 12 via the conduit 24 prior to termination of aeration and agitation as described above. The flocculant aid will preferably consist of relatively small quantities of fresh PNLM and/or PKC, but it can optionally include other common materials such as alum or polymers.

The settling period continues until the liquid level in the aeration and settling zone 12 reaches a predetermined second upper limit, at which time a predetermined amount of the partially-treated wastewater is withdrawn from the aeration and settling zone 12 and transferred to the contact tank 28. A level control means (not shown) or other suitable means can be used for terminating withdrawal of the partially-treated wastewater from the aeration and settling zone 12 when the liquid level therein drops to a predetermined lower limit. After withdrawal of the partially-treated wastewater has been completed, the fill and aeration, settling and draw steps for the primary treatment zone 53 are repeated. During the settling and draw periods, the baffle 54 minimizes disturbance of the solids settling in the aeration and settling zone 12 by the wastewater continuously flowing into the inlet zone 56.

The embodiment illustrated in FIG. 2 provides a number of advantages. Operating the primary treatment zone to control the concentration of solids in the first aqueous phase or partially-treated wastewater flowing therefrom eliminates the need for downstream clarifier equipment. By so limiting the amount of solids entering the contact zone, it can operate with free settling, rather than hindered settling as is the case when large concentrations of suspended solids are present. Contacting the partially-treated wastewater containing a reduced concentration of suspended solids with a fresh PNLM and/or PKC adsorbent in the contact zone improves removal of pollutants. Pollutants which are poorly adsorbed in the aeration and settling zone and carried over into the contact zone are contacted with fresh and more active adsorbent, thereby providing improved removal of these pollutants. The biologically active solids present in the partially-treated wastewater further metabolize pollutants in the contact zone, particularly when aeration with an oxygen-containing gas is used for agitation. The contact or agitation period and the settling period in the contact zone can be conveniently adjusted to meet the requirements for the particular wastewater being treated. While wastewater can be continuously introduced into the primary treatment zone the overall process can be operated as a two-stage batch process.

From the foregoing description, one skilled in the art can easily ascertain the essential characteristics of the invention and, without departing from the spirit and scope thereof, make various changes and modifications to adapt it to various usages.

Third Preferred Embodiment

Figure 3:
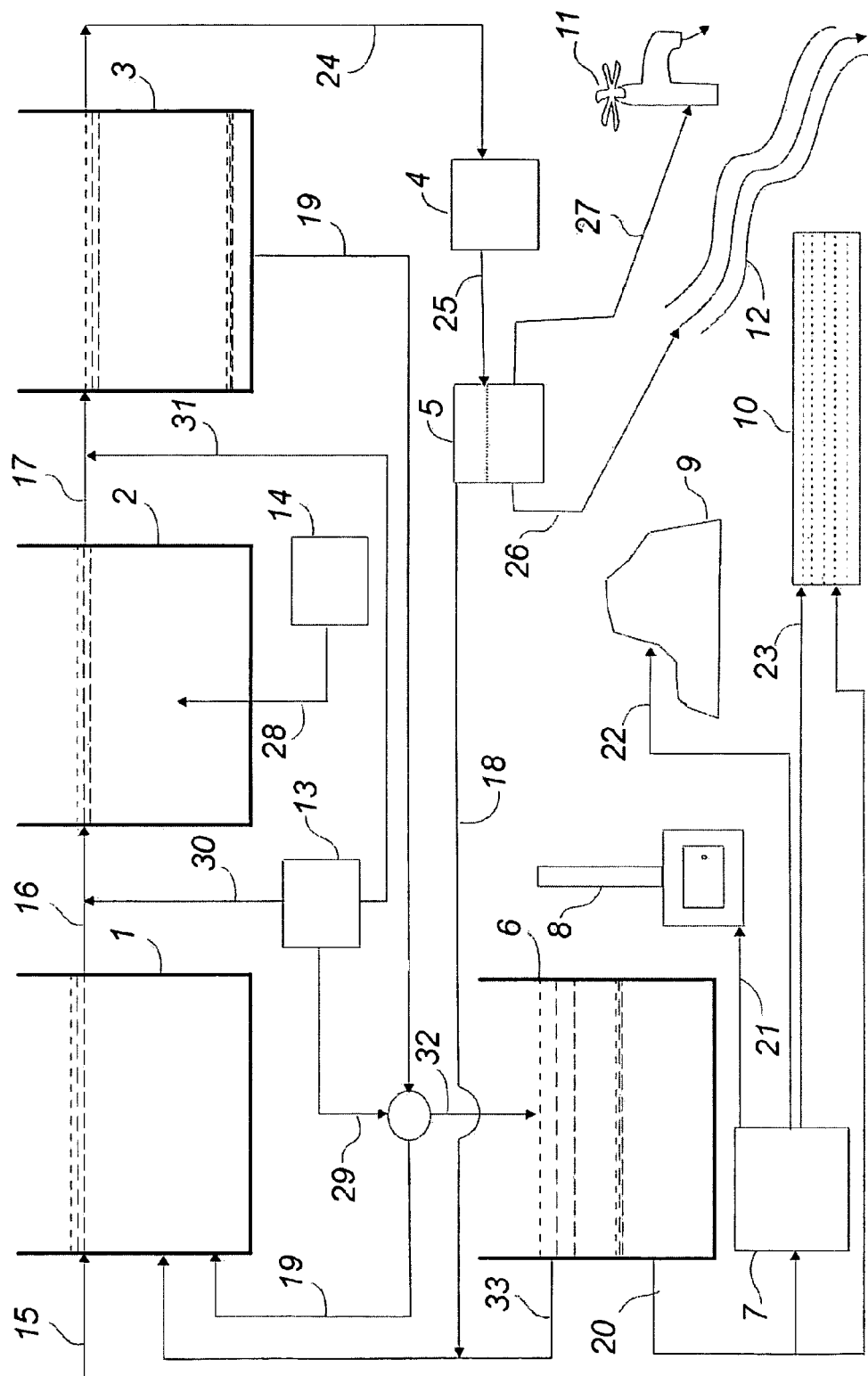
FIG. 3 is a schematic flow diagram of one embodiment of the invention in which wastewater is continuously introduced, following pretreatment for solids, grit and grease removal, to an anoxic mixing tank.

Referring to FIG. 3, a screened raw wastewater containing organic and adsorbable pollutants is introduced by conduit 15 into a mixing tank 1 which incorporates a mixing device. The wastewater is mixed with return activated sludge solids (RASS) removed continuously from the bottom of clarifier 2. Oxygen concentration is lowered in the mixing process to between 0.05 and 0.4 mg/l. Detention time can range between 1 and 12 hours. If the wastewater contains an excessive amount of solids, it can be pretreated and/or clarified by settling, decantation or filtration to reduce the solids content prior to introduction to the anoxic mixing tank 1.

Wastewater is removed continuously from the anoxic mixing basin 1 via a conduit 16 into the aeration zone 2 wherein it is aerated with a pressurized oxygen containing gas (such as air) (from 14 via conduit 28), surface rotating aerators or by any other suitable means 14 (via conduit 28) in the presence of sufficient amounts of a powdered adsorbent and biologically active solids to reduce the BOD, COD, TOC, Nitrogen, Phosphorus and adsorbable pollutants to desired levels. Average detention time can range between 1 and 12 hours. Oxygen levels should be maintained in the range of 1 to 4 mg/l.

The natural lignocellulosic adsorbent must be finely divided and readily dispersible in an aqueous medium. Various adsorbents useful in purifying wastewaters can be used. Suitable adsorbents include sphagnum moss, hemp hurd, jute stick, balsa wood, other hard and soft woods, kenaf core, straws, grass specie stems, bamboo specie stems, reed stalks, peanut shells, coconut husks, pecan shells, rice husk, corn stover, cotton stalk, sugar cane bagasse, conifer and hardwood barks, corn cobs, other crop residuals and any combination thereof, with powdered kenaf core (PKC) being preferred. The adsorbent 13 can be added to the anoxic zone 1 or the aeration zone 2 in any suitable manner, for example, as an aqueous slurry introduced through a conduit 30, or the return activated sludge solids (RASS) through conduit 29. Preferred delivery is through RASS to the anoxic zone 1. This allows better mixing and dispersion of the adsorbent throughout the mixed liquor prior to aeration. Fresh PKC may be optionally added to the clarification zone 3, post aeration, to aid setting through conduit 31.

The amount of adsorbent present in the aeration zone 2 varies, depending primarily on the nature of the wastewater and the degree of treatment desired, i.e., the desired post-treatment levels of BOD, COD, TOC, TSS, TKN and phosphorus. Generally, this amount usually is about 50 to about 5,000 milligrams of adsorbent per liter of wastewater. However, some more toxic wastewaters require up to as much as 20,000 milligrams of adsorbent per liter of wastewater and adsorbent concentrations as low as 5 milligrams per liter of wastewater are effective for some less toxic wastewaters. The biologically active solids present in the aeration zone 2 are suspended solids containing different types of bacteria, protozoa, ciliates, rotifers and other microorganisms formed by contacting wastewater, those same organisms and oxygen. They can be activated sludge or activated solids found in oxidation ponds and other biological water treatment processes. Generally, the amount of biologically active solids present in the aeration zone provides a total suspended solids concentration (combination of both adsorbent and biologically active solids) of about 10 to about 50,000 milligrams per liter of wastewater being treated.

For some wastewaters, particularly some industrial and CAFO wastewaters, it may be necessary to add biologically active solids to the aeration zone 2 during start up to obtain the desired concentration thereof. The process produces its own biologically active solids which can be recycled to the aeration zone 2 from the settling and clarification zone 3, as described below, to ensure the proper level of bacteria and other microorganisms in the aeration zone. Once a suitable concentration of biologically active solids has been reached in the aeration and settling zone 3, that level usually can be maintained without the external addition of the biologically active solids. The above concentration of adsorbent present in the aeration zone 2 includes fresh adsorbent added to the anoxic, aeration and settling zones via conduits 29, 30 and 31, as well as adsorbent recycled to the anoxic zone along with biologically active solids via conduit 19.

The adsorbent and biologically active solids (mixed liquor solids) are first mechanically mixed with influent wastewater in anoxic zone 1, subsequently, they are further mixed by a pressurized oxygen-containing gas, such as air, introduced into the aeration zone 2 by an aeration system 14 to which the pressurized oxygen-containing gas is supplied via a conduit 28. Other suitable aeration distribution means which cause dissolution of oxygen in the mixture and produces agitation can be used. Aeration may also be supplemented by mechanical stirring and mixing means.

Wastewater is removed continuously from the aeration zone 2 via a conduit 17 into the settling zone (clarifier) 3 wherein it is allowed to settle under quiescent conditions. Concentrated mixed liquor solids and adsorbent (RASS) are continuously removed from the bottom of the settling zone 3 through conduit 19 and recycled to anoxic mixing zone 1 where they are blended and mixed with incoming primary screened effluent and fresh adsorbent introduced through conduit 29. Decant from the settling zone (clarifier) 3 is removed continuously via conduit 24 for passage through an optional sand, activated carbon or organic medium charged filtration zone 4 and subsequent chlorination, ozone or ultraviolet treatment in disinfection zone 5. Final treated effluent may then, optionally be discharged through conduit 29 to receiving stream 12 or passed to a recycling function 11 via conduit 27.

When mixed liquor suspended solids (a combination of biologically active microorganisms and adsorbent) concentration reaches some prescribed level (ranging from 2000 mg/l to 50,000 mg/l, depending on wastewater being treated and specific treatment objectives), the mixture of concentrated mixed liquor solids and adsorbent being continuously recovered from the bottom of the clarifier may be partially diverted via conduit 32 to a digester 6 wherein it will be further concentrated and thickened under either aerobic or anaerobic conditions. Decant from the digester 6 is returned to the anoxic mixing zone 1 via conduit 33. Thickened sludge solids may then be passed via conduit 20 to sludge dewatering and/or stabilization zone 7 or directly land applied 10 as a liquid sludge via conduit 20. Dewatered, stabilized sludge may subsequently be disposed of through incineration 8, landfill deposition 9 or land application 10 using transport 21, 22 or 23, respectively. Stabilization may, among other methods, include addition of lime.

Depending on the strength of the wastewater being treated and the treatment objectives to be served, a second complete aeration, settling and anoxic cycle may replace filtration zone 5, or optionally precede filtration zone 5. That cycle would treat a significantly lower strength (BOD, COD TSS, TKN) effluent (than was treated in the first cycle), but would be operated, nevertheless, according to similar principles. Concentrations of mixed liquor solids, powdered natural lignocellulosic adsorbent (preferably powdered kenaf core) and detention times would be tailored appropriately to the wastewater strength and treatment objectives.

From the foregoing description, one skilled in the art can easily ascertain the essential characteristics of the invention and, without departing from the spirit and scope thereof, make various changes and modifications to adapt it to various usages.

Fourth Preferred Embodiment

Figure 4:
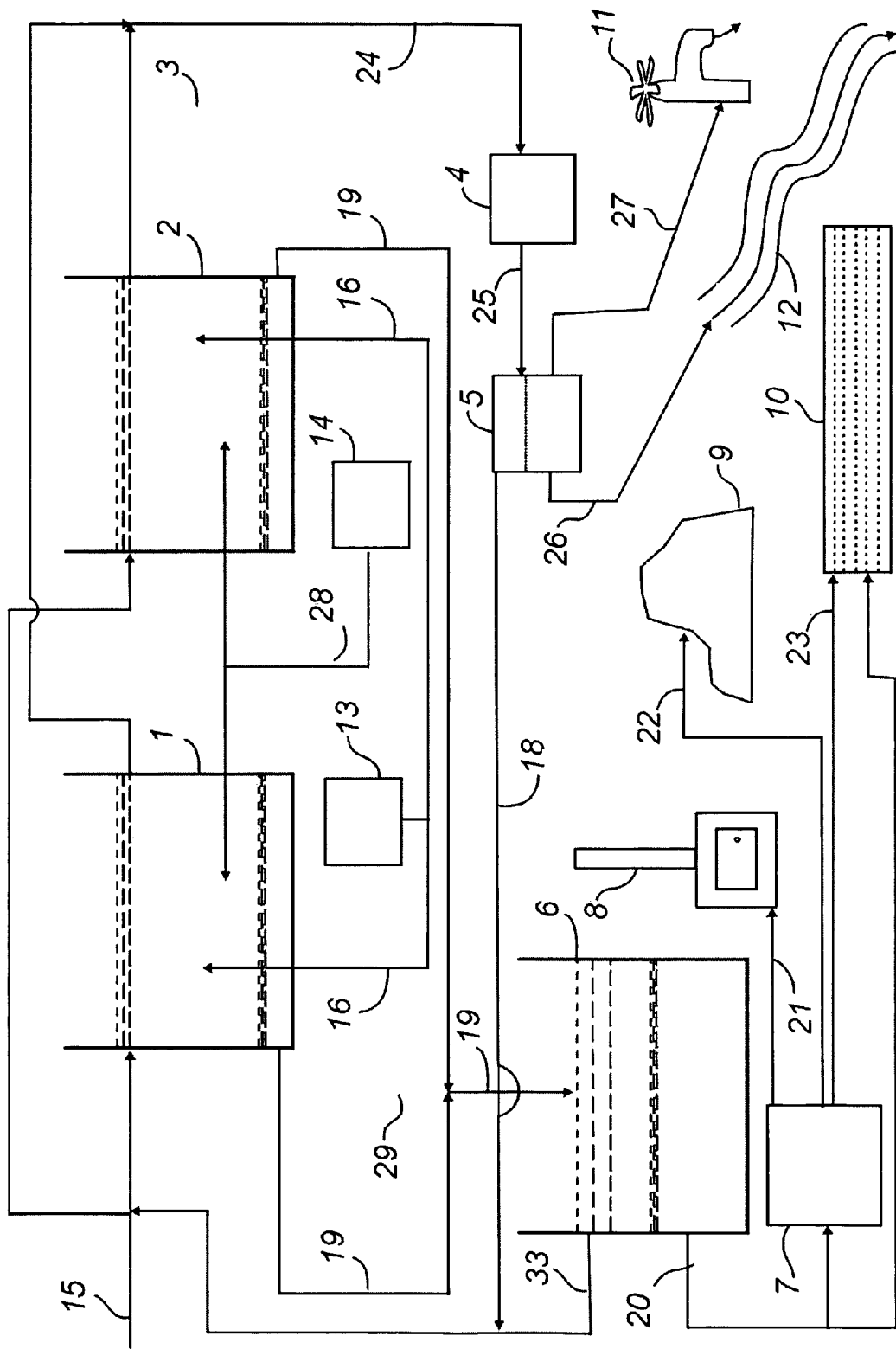
FIG. 4 is a schematic flow diagram of another embodiment of the invention in which wastewater, following pretreatment for solids, grit and grease removal, is continuously treated using a variety of sequencing batch reactor circumstances.

Referring to FIG. 4, a screened raw wastewater containing organic and adsorbable pollutants is introduced sequentially by conduit 15 into one of two or more batch reactor vessels 1,2 containing a prescribed residual of concentrated biologically active solids and powdered natural lignocellulosic adsorbent (preferably powdered kenaf core). The combined raw wastewater, biologically active solids and powdered natural lignocellulosic adsorbent is continuously mixed in such a manner as to minimize incorporation of oxygen while also maximizing contact by the residual solids with the influent wastewater. An anoxic phase, which can vary at the operators discretion, depending on influent wastewater strength (BOD, COD, TOC, TSS, TKN, phosphorus and other adsorbable pollutants), is followed by an aerobic phase during which aeration is supplied with a pressurized oxygen containing gas (such as air), 14 via conduit 28, surface rotating aerators or by any other suitable means in the presence of sufficient amounts of a powdered adsorbent and biologically active solids to reduce the BOD, COD, TOC, Nitrogen, Phosphorus and adsorbable pollutants to desired levels. Average detention time during the aerobic phase can range between 30 minutes and 12 hours. Dissolved oxygen levels should be raised to and maintained in the range of 1 to 4 mg/l. The aerobic sequence is followed by a settling sequence in which the combination of biologically active solids and powdered natural lignocellulosic adsorbent is allowed to settle to the bottom of the reactor vessel 1,2. Clarified effluent supernatant is then discharged via conduit 24 for passage through an optional sand, activated carbon or organic medium charged filtration zone 4 and subsequent chlorination, ozone or ultraviolet treatment in disinfection zone 5. Final treated effluent may then, optionally be discharged through conduit 29 to receiving stream 12 or passed to a recycling function 11 via conduit 27. Excess sludge is removed from the bottom of reactor vessel 1,2 and passed via conduit 19 to digester 6 for subsequent thickening and/or conditioning.

Makeup powdered natural lignocellulosic adsorbent (preferably powdered kenaf core) is introduced directly into the batch reactor vessel 1,2 via conduit 16 in amounts sufficient to develop and or maintain desired concentrations of said adsorbent in the reactor vessel 1,2. Generally, this amount is about 50 to about 5,000 milligrams of adsorbent per liter of wastewater. However, some more toxic wastewaters require up to as much as 20,000 milligrams of adsorbent per liter of wastewater and adsorbent concentrations as low as 5 milligrams per liter of wastewater are effective for some less toxic wastewaters. The adsorbent must be finely divided and readily dispersible in an aqueous medium. Various adsorbents useful in purifying wastewaters can be used. Suitable adsorbents include sphagnum moss, hemp hurd, jute stick, balsa wood, other hard and soft woods, kenaf core, straws, grass specie stems, bamboo specie stems, reed stalks, peanut shells, coconut husks, pecan shells, rice husk, corn stover, cotton stalk, sugar cane bagasse, conifer and hardwood barks, corn cobs, other crop residuals and any combination thereof, with powdered kenaf core (PKC) being preferred. The adsorbent 13 can be added to the reactor vessel during the anoxic fill sequence in any suitable manner, for example, as an aqueous slurry introduced through a conduit 19.

The biologically active solids present in the batch reactor vessel 1,2 are suspended solids containing different types of bacteria, protozoa, ciliates, rotifers and other microorganisms formed by contacting wastewater, a base population of those same organisms and oxygen. They can be activated sludge or activated solids found in oxidation ponds and other biological water treatment processes. Generally, the amount of biologically active solids present in the filled batch reactor vessel provides a total suspended solids concentration (both adsorbent and biologically active solids) of about 10 to about 50,000 parts per million of wastewater being treated.

For some wastewaters, particularly some industrial and CAFO wastewaters, it may be necessary to add biologically active solids to the reactor vessel 1,2 during start up to obtain the desired concentration thereof. The process produces its own biologically active solids which can be recycled within the system to ensure the proper level of bacteria and other microorganisms during the anoxic and aerobic sequences. Once a suitable concentration of biologically active solids has been reached, that level usually can be maintained without the external addition of the biologically active solids. The above concentration of adsorbent present in the reactor vessel 1,2 includes fresh adsorbent added during the anoxic fill sequence as well as adsorbent recycled following the settling sequence.

Reactor vessel 2 begins an anoxic fill sequence upon reactor vessel 1 having been filled, and vice versa. Other vessels may also be used in sequence, with the influent stream switching from one to the next as each completes the full anoxic fill, anoxic, aerobic, settle and discharge sequence cycle.

Decant (supernatant) discharged from the reactor vessel following the settle sequence (clarification) is removed via conduit 24 for passage through an optional sand, activated carbon or organic medium charged filtration zone 4 and subsequent chlorination, ozone or ultraviolet treatment in disinfection zone 5. Final treated effluent may then, optionally, be discharged to receiving stream 12 through conduit 26 or passed to a recycling function 11 via conduit 27.

Excess mixed liquor suspended solids (a combination of biologically active organisms and adsorbent) is removed from the bottom of the reactor vessel 1,2 upon conclusion of the settling sequence, and diverted via conduit 19 to a digester 6 wherein it will be further concentrated and thickened under either aerobic or anaerobic conditions. Decant (supernatant) from the digester 9 is merged with the influent raw wastewater stream via conduit 33. Thickened sludge solids may then be passed via conduit 20 to sludge dewatering and/or stabilization zone 7 or directly land applied 10 as a liquid sludge via conduit 20. Dewatered, stabilized sludge may subsequently be disposed of through incineration 8, landfill deposition 9 or land application 10 using transport 21, 22 or 23, respectively. Stabilization may, among other methods, include addition of lime.

Depending on the strength of the wastewater being treated and the treatment objectives to be served, a second complete SBR system, may replace filtration zone 4, or optionally precede filtration zone 5. That cycle would treat a significantly lower strength (BOD, COD TSS, TKN) effluent (than was treated in the first cycle), but would be operated, nevertheless, according to similar principles. Concentrations of mixed liquor solids, powdered natural lignocellulosic adsorbent (preferably powdered kenaf core) and detention times would be tailored appropriately to the wastewater strength and treatment objectives.

From the foregoing description, one skilled in the art can easily ascertain the essential characteristics of the invention and, without departing from the spirit and scope thereof, make various changes and modifications to adapt it to various usages.

The following examples are merely illustrative and representative of our invention which is of considerably larger scope. These examples should not be considered limiting in any way.

EXAMPLE 1

An extended aeration activated sludge wastewater treatment plant treating an average municipal-industrial wastewater flow of approximately 2 million gallons per day (MGD) was selected for full scale testing of our invention. This selection followed the rationale that such a plant fit the profile of a typical future user of the invention. The configuration of the plant conforms with the flow diagram depicted in FIG. 3.

The experimental protocol called for gradually increasing the concentration of finely powdered kenaf core (PKC) in the system to a stable level equivalent to 500 mg/l of total activated sludge mixed liquor. The average sludge age of the wastewater treatment plant was estimated to be 30 days.

Finely powdered kenaf core was prepared by fracturing kenaf core with a conventional hammer mill and passing it through a 70 mesh (200 micron) screen. Other methods of grinding, milling and/or refining may have been used in its preparation. The powdered kenaf was packed in 2 cubic foot dissolving plastic bags—20 lbs to a bag.

PKC was introduced into the wastewater treatment plant by sequentially placing 20 lb bags of the material (packed in dissolving plastic bags) into the return line conveying return activated sludge solids (RASS) from the clarifier(s) to the approximately 800,000 gallon capacity anoxic raw influent-RASS mixing basin. The resulting PKC-supplemented mixed liquor then passed continuously to the approximately 800,000 gallon capacity aeration basin where oxygen was supplied by four 50 hp floating aerators. PKC was initially introduced into the activated sludge at a rate of 1500 lbs per week on a Monday, Wednesday, Friday schedule (500 lbs per episode). This schedule was maintained from Jun. 16, 2004 through Jul. 26, 2004. When local wastewater treatment plant managers pronounced themselves satisfied that the wastewater treatment system was not "suffering," inputs were increased to 500 lbs per day through August 8. The concentration of PKC in the wastewater treatment plant activated sludge mixed liquor, assuming an average daily decay rate of 1%, was calculated to be 426 mg/l on August 9. June 16 through August 8 was considered to be an acclimation period during which target nitrifying bacteria attached to (colonized) the PKC. On August 8 all digester sludge was removed and land applied. Wastewater treatment plant managers agreed to maintain an active experiment "until the next requirement to remove sludge from the digesters"—i.e., when the digesters were next filled to their capacity and land application would be mandated. The managers' primary objective was to see if a lowering of sludge disposal costs could be achieved.

After August 8, a "maintenance" level input of PKC required to maintain PKC concentrations in the mixed liquor at "approximately 500 mg/l, was calculated to be 1500 lbs per week. A Monday, Wednesday, Friday input (500 lbs per episode) schedule was followed and maintained through Nov. 29, 2004. Average PKC concentration during that period was calculated to be 473 mg/l.

The same calendar interval (August through November) during 2003 served as a control to allow a reasonable estimate of the efficacy of PKC inputs. Measurement of system efficacy was, necessarily, limited to system variables measured during the control period for routine system control purposes. These were:

Influent Flow
Influent Temperature
Influent pH
Influent BOD
Influent TSS
Mixed Liquor Solids
Oxygen Levels (Anoxic and Aeration Zones)
Oxygen Uptake Rates
Return Activated Sludge Solids
Sludge Settling Speed (30 minutes)
Effluent Ammonia
Effluent Nitrate
Effluent TKN
Effluent Phosphorus
Effluent pH
Effluent BOD
Effluent TSS
Clarifier Sludge Profiles (levels)
Sludge Wasted to Digester (gallons)
Sludge Wasted to Digesters (total solids)
Profile of Thickened Digester Sludge Land Applied
    Gallons
    Nitrogen
    Phosphorus
    Total Solids

TABLE 1

Basic System Comparison between the Control (No PKC) and Experimental Period (PKC).

| System Variable Measured | No PKC | With PKC | PKC Advantage |
|---|---|---|---|
| Influent Wastewater Flow (MGD) | 2.07 | 2.02 | 2.52% Lower During PKC Testing |
| Average Mixed Liquor Temperature (deg. C.) | 23.72 | 24.18 | 1.92% Higher During PKC Testing |
| Average Influent BOD (mg/l) | 151.41 | 118.42 | 21.79% Lower During PKC Testing |

TABLE 1-continued

Basic System Comparison between the Control (No PKC) and Experimental Period (PKC).

| System Variable Measured | No PKC | With PKC | PKC Advantage |
|---|---|---|---|
| Average Influent TSS (mg/l) | 148.70 | 120.94 | 18.67% Lower During PKC Testing |

Note that both influent BOD and TSS levels were somewhat higher during the control period, but temperature was comparable in both periods.

TABLE 2

Comparative System Performance - Control (No PKC) Versus Experimental Period (PKC).

| Performance Variable Measured | No PKC | With PKC | PKC Advantage |
|---|---|---|---|
| Average Effluent BOD | 5.27 | 3.38 | 35.88% Lower with PKC |
| Average % BOD Reduction | 96.46% | 97.02% | 0.58% Lower with PKC |
| Effluent BOD as % of Influent BOD | 3.54% | 2.98% | 15.89% Lower with PKC |
| Total BOD Reduction (mg/l) | 146.14 | 115.04 | 21.28% Lower with PKC |
| Average Effluent TSS (mg/l) | 4.88 | 5.48 | 12.30% Higher with PKC |
| Average TSS % Reduction | 95.93% | 95.19% | 0.77% Lower with PKC |
| Avg. Effluent TSS as % of influent TSS | 6.07% | 4.69% | 22.79% Lower with PKC |
| Avg. Total TSS Reduction (mg/l) | 111.75 | 115.46 | 3.32% Higher with PKC |
| Avg. Effluent Ammonia Levels (mg/l) | 0.62 | 0.37 | 39.98% Lower with PKC |
| Avg. TSS Nitrate Levels (mg/l) | 1.76 | 2.13 | 20.80% Higher with PKC |
| Avg. TSS TKN (nitrogen) Levels (mg/l) | 2.17 | 1.59 | 26.54% Lower with PKC |
| Avg. Effluent Phosphorus Levels (mg/l) | 0.77 | 1.10 | 42.95% Higher with PKC |
| Avg. FPKC Concentration (mg/l) | 0 | 473.67744 | |
| Sludge Settling in 30 Minutes (2 ltr to --> mls) | 650 | 723 | 11.24% Higher with PKC |
| Sludge Settling Rate (mls/min) | 34 | 31 | 7.90% Lower with PKC |
| Oxygen Uptake Rate (ml/min) | 0.259 | 0.260 | 0.34% Higher with PKC |
| Zone Settling Velocity (ft/hr) | 0.571 | 0.423 | 25.92% Slower with PKC |
| Average MLS Concentration (mg/l) | 4051.875 | 3912.748 | 3.43% Lower with PKC |
| Organism Only Avg MLS Concentration (mg/l) | 4052 | 3439 | 15.12% Lower with PKC |
| RASS Concentration (mg/l) | 6749 | 5863 | 13.13% Lower with PKC |
| RASS to MLS Ratio | 1.661 | 1.499 | 9.72% Lower with PKC |
| RASS Wasted (glns) | 18204 | 14065 | 22.74% Lower with PKC |
| Sludge Solids Wasted per day (kgs) | 457.715 | 313.9823 | 31.40% Lower with PKC |
| FPKC Wasted per day (kgs) | 0 | 38.45 | |
| Microorganism Base Load (tonnes) | 44 | 37 | 15.12% Lower with PKC |
| Sludge Microorganism Production (kgs/day) | 457.715 | 275.5298 | 39.80% Lower with PKC |
| Sludge Organism Production Rate (kgs/tonne/day) | 10.56815 | 7.378487 | 30.18% Lower with PKC |
| #1 Clarifier Sludge Level A.M. (ft) | 1.86328 | 1.786304 | 4.13% Lower with PKC |
| #1 Clarifier Sludge Level P.M. (ft) | 1.946747 | 1.872823 | 3.80% Lower with PKC |
| #2 Clarifier Sludge Level A.M. (ft) | 1.999435 | 1.866935 | 6.63% Lower with PKC |
| #2 Clarifier Sludge Level P.M. (ft) | 2.029247 | 2.01453 | 0.73% Lower with PKC |
| #3 Clarifier Sludge Level A.M. (ft) | 2.040417 | 1.820538 | 10.78% Lower with PKC |
| #3 Clarifier Sludge Level P.M. (ft) | 2.175565 | 1.910013 | 12.21% Lower with PKC |
| Days of Digester Sludge Accumulation to Disposal | 63 | 103 | 63% Higher with PKC |
| Digester Sludge % Solids at Disposal | 3.82% | 3.63% | 5% Lower with PKC |
| Daily Digester Solids Accumulation (kgs) | 874 | 540 | 38% Lower with PKC |
| Nitrogen Content of Digester Solids at Disposal (mg/kg) | 43550 | 54200 | 24% Lower with PKC |
| Daily Nitrogen Accumulation in Digester Solids (kg/day) | 38 | 29 | 23% Lower with PKC |
| Phosphorus Content of Digester Solids (mg/kg) | 13983 | 18100 | 29% Higher with PKC |
| Daily Phosphorus Accumulation in Digester Solids (kgs/day) | 12 | 10 | 20% Lower with PKC |

From a wastewater treatment plant operator's perspective, the key results of this example are the significant reduction in effluent ammonia and total nitrogen, the significant decrease in total sludge production and the improvement in clarifier sludge profile and sludge floc characteristics. The latter characteristic allowed operators to continue operating aerators during high rain events when aerators would normally be shut down and the "event" allowed to "flow over the top and out." Consequently, there was no discharge of untreated sewage, no permit violation and therefore no fine during implementation of the experimental protocol. The decrease in total sludge production resulted in a 40% reduction in sludge disposal costs. The reduction in effluent nitrogen, the improvement in clarifier sludge profile and the improvement in sludge floc characteristics were felt to hold potential consequences for increasing the treatment plant's rated capacity and thus lowering the municipality's potential future capital outlays.

Plant operators noted, with satisfaction, that BOD and TSS reduction performance was comparable, despite maintenance of a significantly lower base microorganism population. Both variables were maintained within effluent discharge permit limits throughout. An increase in effluent phosphorus content was attributed to lower total sludge production. While this had no immediate bearing on the treatment plant's permitted discharge levels, the increase was significant and notable. Subsequent experiments demonstrated that, with maintenance of somewhat higher mixed liquor base organism loads and higher PKC concentrations phosphorus reduction actually improved significantly in the experimental system over the control (No PKC)—See example 2 (below). This operating condition would, however, negate some of the lower sludge production advantage.

Plant operators noted that the ability to maintain lower sludge microorganism base loads within the treatment plant's activated sludge mixed liquor, combined with a higher oxygen uptake rate for PKC-enhanced mixed liquor translated to an ability to lower, significantly, the amount of energy invested in aeration. They noted that aerator electricity was, aside from sludge disposal, the single most costly item on the wastewater treatment plant's annual budget.

Plant operators also noted, in small bench level testing, the improved ability of PKC-supplemented activated sludge solids to pick up phenols, oils, arsenic, copper, zinc, iron and lead over non-PKC supplemented activated sludge solids. These improvements could not be made apparent in the major complete system test results because such data had not been routinely collected during the 2003 control period. Plant operators also noted external test results which showed that PKC's ability to filter out water borne organic and inorganic compounds was comparable to that of granular activated carbon. They recognized that this would have an impact on their ability to cater to "high dollar" industrial clients, some of which were then prevented from supplying effluent streams to the treatment plant due to that plant's limited capacity to remove certain toxic elements and compounds. They noted that this could potentially result in a significant increase in future revenues.

Plant operators and managers considered the experiment to be a "success," noting that, when the product became commercially available, they would be amenable to adopting its use.

EXAMPLE 2

Two small 300 gallon sequencing batch reactor wastewater treatment systems were constructed on the perimeter of the activated sludge aeration basin located at the wastewater treatment plant employed for example 1. The purpose of the two systems was to determine the immediate effects of relatively high adsorbent loadings on activated sludge wastewater treatment systems—particularly sludge floc and settling characteristics and impact on nitrogen and phosphorus reduction.

Each system comprised a 0.5 HP pump for internal mixing and batch discharge, a 1 hp air pump, a 1 square foot tablet diffuser, an electronic timer and a 200 watt heater. Each was operated on a 24 hour cycle in batch mode, beginning with a 6 hour anoxic-fill sequence, followed by a 12 hour (half hour on and half hour off) aeration sequence, a 5 hour settling sequence, and finally a 1 hour supernatant discharge sequence. Powdered Kenaf Core (PKC) adsorbent was added upon commencement of the fill sequence.

Each small system was initially charged with 250 gallons of mixed liquor, drawn directly from the main activated sludge aeration basin. Initial MLSS concentration was measured to be 3240 mg/l. Initial PKC adsorbent concentrations in each system were calculated to be 473 mg/l. Upon filling, a 5 hour settling sequence, followed by a 1 hour discharge sequence (150 gallons of treated supernatant) commenced. The discharge pump then converted back to its mixing mode, and each system was charged with 150 gallons of screened raw wastewater. During loading of raw wastewater, the "experimental" system was also charged with a measured amount of PKC. Upon completion of the anoxic mixed fill sequence normal operations commenced—i.e., aeration, settling, discharge, anoxic fill, PKC (experimental system only), aeration etc. This same sequence was repeated daily for the 64-day duration of the experiment. Daily testing was conducted on each system for effluent ammonia nitrogen and sludge settling characteristics. Occasional testing was conducted for effluent nitrate nitrogen, phosphorus, MLSS concentration, and influent ammonia nitrogen. System wide data (main wastewater treatment plant) was already available for influent BOD, TSS, pH and temperature.

PKC inputs commenced with daily injections of 60 grams of the adsorbent into the experimental system. After 12 days the schedule changed to every other day. On day 33 the kenaf injection level was doubled to 120 grams, with the every other day schedule remaining unchanged. This same protocol was then continued until day 64.

Basic System Data (shared by both SBR systems—control and experimental system)

| Relative System Performance Data | |
| --- | --- |
| Performance Variable Measured | |
| Average Influent BOD (mg/l) | 127.92 |
| Average Influent TSS (mg/l) | 140.05 |
| Average Influent pH | 7.12 |
| Average Influent Ammonia (mg/l) | 12.49 |

| Performance Variable Measured | Low PKC | High PKC | Relative Performance of High PKC System |
| --- | --- | --- | --- |
| Average Ammonia (mg/l) | 0.75 | 0.41 | 45.57% Less Than Low PKC |
| Average Nitrate (mg/l) | 2.29 | 1.71 | 25.16% Less Than Low PKC |
| Average Phosphorus (mg/l) | 1.65 | 0.97 | 40.90% Less Than Low PKC |
| Average Settling (2 ltrs to --> mls) | 565.09 | 526.29 | 6.87% Less Than Low PKC |
| Average PKC Concentration (mg/l) | 355.65 | 1393.82 | 291.90% Greater Than Low PKC |
| Average Flow Treated | 150.00 | 150.00 | 0.00% |
| Day 34 MLSS | 4830.00 | 5340.00 | 10.56% Greater than Low PKC |
| Day 1 MLSS | 3240.00 | 3240.00 | 0.00% |
| Average Daily MLSS Increase (mg/l) | 48.18 | 63.64 | 32.08% Greater than Low PKC |
| Day 34 PKC Concentration | 329.66 | 1518.98 | 360.78% Greater Than Low PKC |
| Day 1 PKC Concentration | 473.36 | 473.36 | 0.00% |
| Average Daily PKC Increase (mg/l) | −4.35 | 31.69 | |
| Average Daily Increase of Organisms | 52.54 | 31.95 | 39.18% Less than Low PKC |
| Average Daily PKC input (kgs/day) | 0 | 0.06 | |
| Length of Study (days) | 69 | 69 | 0.00% |

The SBR configuration generally outperform the larger, adjacent extended aeration wastewater treatment plant. The high PKC system also outperformed the diminishing PKC ("low PKC") system, with advantages generally mirroring those identified with the extended aeration system (see EXAMPLE 1, above). One notable exception to this was phosphorus reduction. While the PKC-charged (approximately 500 mg/l) extended aeration system demonstrated lower phosphorus removal than its comparable 2003 control sequence, the high PKC SBR system demonstrated significantly better phosphorus removal than the low PKC SBR system. This may be generally attributable to maintenance of a higher MLSS concentration and/or, more specifically, to the considerably higher PKC concentrations in the MLSS. Phosphorus content of land applied digester solids incorporating PKC also demonstrated a 20% increase in phosphorus content (% of total solids basis) over non-PKC digester solids, suggesting enhanced pickup (on a per weight of solids basis) of phosphorus by PKC-enhanced MLSS.

While the MLSS concentration of the high PKC SBR system grew more quickly than did the control system, it is notable that the growth attributable to activated sludge organisms was measured to be approximately 40% lower than the control. This confirms the "lower sludge production" result of EXAMPLE 1 (above)

Other notable enhanced performance demonstrated by the high PKC SBR system, was a significant advantage in both ammonia (45% improvement) and nitrate (25% improvement) reduction over the low PKC control system.

With PKC concentrations rising to approximately 2300 mg/l (of total mixed liquor), there was no discernable "irregularity" in sludge settling behavior. Sludge settling was notably quicker than that of the low PKC control.

What is claimed is:

1. A method for the biological treatment of contaminated waste streams comprising the steps of:
creating an activated sludge treatment process further comprising the steps of:
if petroleum is present in the waste stream, then pre-processing the waste stream to remove the petroleum for providing a non-petroleum-waste-containing water;
introducing at least one biologically activated organism into non-petroleum-waste-containing water;
introducing powdered natural lignocellulosic adsorbent material into water, wherein the material is released in an unrestricted position within the water and adsorbs and/or absorbs contaminants in the water;
removing the material, which at that point of removal has encapsulated the contaminants,
and providing a treated water output that is decontaminated by activity of the at least one biologically activated organism as the output of the process,
thereby providing a decontaminated water.

2. The method of claim 1, further including the step of mixing the material within the water.

3. The method of claim 1, wherein the method provides for random adsorption of the contaminants by the material.

4. The method of claim 1, wherein the unrestricted position of the material provides dynamic mixing of the material within the water.

5. The method of claim 1, wherein biologically activated organism is bacteria, and the unrestricted position of the material provides for increased surface area contact between the material and the contaminants within the water, thereby providing increased bacteria efficiency.

6. The method of claim 5, wherein the unrestricted position of the material provides enhanced settling of bacteria.

7. The method of claim 1, wherein the at least one organism is bacteria, including a rapidly growing heterotroph and a slow-growing bacteria, thereby providing enhanced efficiency and lower bacterial population, thereby reducing the production of sludge produced by the rapidly growing heterotroph.

8. The method of claim 1, further including the steps of
(a) contacting a contaminated waste stream with the organic adsorbent material and at least one activated sludge organism for a time sufficient to biologically degrade contaminants in the waste stream, thereby producing a decontaminated waste stream and a mixture of activated sludge, adsorbent and microorganism encapsulated powdered adsorbent; and
(b) separating the activated sludge, the adsorbent and the microorganism encapsulated adsorbent from the decontaminated waste stream.

9. The method of claim 8 wherein the activated sludge enhances dissolved oxygen by a process selected from the group consisting of plug-flow, back mix, oxidation ditch, extended aeration, sequencing batch, other aerobic wastewater treatment method, and combinations thereof.

10. The method of claim 8 wherein the activated sludge comprises anaerobic cellular microorganisms.

11. The method of claim 8 wherein the activated sludge comprises aerobic cellular microorganisms.

12. The method of claim 8 wherein the activated sludge comprises anoxic cellular microorganisms.

13. The method of claim 8 wherein the powdered adsorbent is a crop residual.

14. The method of claim 13, wherein the crop residual is selected from the group consisting of sphagnum moss, hemp hurd, jute stick, balsa wood, other hard and soft woods, kenaf core, crop straws, grass specie stems, bamboo specie stems, reed stalks, peanut shells, coconut husks, pecan shells, other shells, rice husk, other grain husks, corn stover, other grain stalks, cotton stalk, sugar cane bagasse, conifer and hardwood barks, corn cobs, and combinations thereof.

15. The method of claim 8, wherein the powdered adsorbent comprises powdered kenaf core.

16. The method of claim 1, further including the step of:
(c) recycling the unregenerated recovered powdered adsorbent and activated sludge for recontact with a contaminated waste stream, and removal of the clarified, decontaminated waste stream for subsequent processing, reuse or discharge.

17. The method of claim 1, wherein the adsorbent material is a natural organic material.

18. The method of claim 1, further including the step of adding an inorganic material.

19. The method of claim 1, wherein the adsorbent material is kenaf.

20. A process for the biological treatment of contaminated waste streams incorporating use of natural organic adsorbent material in an activated sludge process and comprising, in combination, the steps of:
(a) if petroleum is present in the waste stream, then pre-processing the waste stream to remove the petroleum for providing a non-petroleum-contaminated waste stream and then contacting the non-petroleum-contaminated waste stream with organic powdered natural lignocellulosic adsorbent material and activated sludge organisms for a time sufficient to biologically degrade contaminates in the waste stream by activity of the organisms, thereby producing a decontaminated waste stream and a mixture of activated sludge, adsorbent and microorganism encapsulated powdered adsorbent;
(b) separating the activated sludge, the adsorbent and the microorganism encapsulated adsorbent from the decontaminated waste stream;
(c) recycling the unregenerated recovered powdered adsorbent and activated sludge for recontact with a contaminated waste stream, and removal of the clarified, decontaminated waste stream for subsequent processing, reuse or discharge and (d) providing a treated water output that is decontaminated as the output of the process.

21. The process of claim 20, wherein the activated sludge process incorporates a method by which to enhance dissolved oxygen and may be selected from the group consisting of plug-flow, back mix, oxidation ditch, extended aeration, sequencing batch, or any other aerobic wastewater treatment method and combinations thereof.

22. The process of claim 20 wherein the activated sludge comprises anaerobic cellular microorganisms.

23. The process of claim 20 wherein the activated sludge comprises aerobic cellular microorganisms.

24. The process of claim 20 wherein the activated sludge comprises anoxic cellular microorganisms.

25. The process of claim 20 wherein the powdered adsorbent is selected from the group consisting of sphagnum moss, hemp hurd, jute stick, balsa wood, other hard and soft woods, kenaf core, crop straws, grass specie stems, bamboo specie stems, reed stalks, peanut shells, coconut husks, pecan shells, other shells, rice husk, other grain husks, corn stover, other grain stalks, cotton stalk, sugar cane bagasse, conifer and hardwood barks, corn cobs, other crop residuals and any combination thereof.

26. The process of claim 20, wherein the powdered adsorbent comprises powdered kenaf core.

27. A process for the treatment or pretreatment of contaminated waste streams containing relatively high levels of organic solids, high BOD and/or high COD incorporating use of powdered natural organic adsorbent material in that process and comprising, in combination, the steps of:
(a) if petroleum is present in the waste stream, then pre-processing the waste stream to remove the petroleum for providing a non-petroleum-containing waste stream and contacting a high volatile solids, high BOD and/or high COD contaminated waste stream containing colloidal material and suspended volatile organic material with powdered organic lignocellulosic adsorbent material and vigorously mixing for a time sufficient to create a fully mixed blend and to allow adsorption by the adsorbent of readily adsorbable oils as well as colloidal, suspended and dissolved components of the waste stream;
(b) creating a quiescent circumstance wherein the mixed blend is subject to minimal agitation and allowing separation by floatation and by gravity those oils, surfactants, solids and adsorbed elements of the waste stream that have adhered to or been encapsulated by the powdered adsorbent;
(c) and removal of the settled and floating solids (for subsequent processing, digestion and/or dewatering and disposal) and removal of the clarified waste stream for subsequent processing, possible reuse or disposal
and (d) providing a treated water output that is decontaminated as the output of the process.

28. The process of claim 27, wherein the powdered adsorbent is selected from the group consisting of sphagnum moss, hemp hurd, jute stick, balsa wood, other hard and soft woods, kenaf core, crop straws, grass specie stems, bamboo specie stems, reed stalks, peanut shells, coconut husks, pecan shells, other shells, rice husk, other grain husks, corn stover, other grain stalks, cotton stalk, sugar cane bagasse, conifer and hardwood barks, corn cobs, other crop residuals and any combination thereof.

29. The process of claim 27, wherein the powdered adsorbent comprises powdered kenaf core.

30. A process for the treatment or post-treatment of liquid phase discharge from the clarification sequence of an activated sludge process containing unacceptably high levels of suspended solids, toxins or dissolved material and incorporating use of powdered natural organic adsorbent material in that process and comprising, in combination, the steps of:
(a) if petroleum is present in the waste stream, then pre-processing the waste stream to remove the petroleum for providing a non-petroleum-waste stream and contacting the non-petroleum-waste stream with powdered organic lignocellulosic adsorbent material and vigorously mixing for a time sufficient to create a fully mixed blend and to allow adsorption by the adsorbent of readily adsorbable suspended and dissolved components of the waste stream;
(b) creating a quiescent circumstance wherein the mixed blend is subject to minimal agitation and allowing separation by gravity those solids and adsorbed elements of the waste stream that have adhered to or been encapsulated by the powdered adsorbent;
(c) and removal of the settled solids for subsequent processing, digestion or dewatering and disposal and discharge of the clarified waste stream for subsequent processing, possible reuse or disposal
and (d) providing a treated water output that is decontaminated as the output of the process.

31. The process of claim 30 wherein the powdered adsorbent is selected from the group consisting of sphagnum moss, hemp hurd, jute stick, balsa wood, other hard and soft woods, kenaf core, crop straws, grass specie stems, bamboo specie stems, reed stalks, peanut shells, coconut husks, pecan shells, other shells, rice husk, other grain husks, corn stover, other grain stalks, cotton stalk, sugar cane bagasse, conifer and hardwood barks, corn cobs, other crop residuals and any combination thereof.

32. The process of claim 30 wherein the powdered adsorbent comprises powdered kenaf core.

33. A method for the biological treatment of contaminated waste streams comprising the steps of:
providing an activated sludge treatment process further comprising the steps of:
if petroleum is present in the waste stream, then pre-processing the waste stream to remove the petroleum for providing a non-petroleum-waste-containing water;
introducing at least one biologically activated organism into non-petroleum-waste-containing water,
introducing powdered natural lignocellulosic adsorbent material into water, wherein the material is released in within the water and adsorbs and/or absorbs contaminants in the water;
removing the material, which at that point of removal has encapsulated the contaminants, and providing a treated water output that is decontaminated by activity of the at least one biologically activated organism as the output of the process,
thereby providing a decontaminated water.

* * * * *